(12) United States Patent
Shimamura

(10) Patent No.: US 7,197,450 B2
(45) Date of Patent: Mar. 27, 2007

(54) TRANSLATION SERVER, METHOD, AND PROGRAM UTILIZING AN UPDATED TRANSLATED SENTENCE CACHE DATABASE

(75) Inventor: Kaoru Shimamura, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 10/436,672

(22) Filed: May 13, 2003

(65) Prior Publication Data

US 2003/0225569 A1    Dec. 4, 2003

(30) Foreign Application Priority Data

May 29, 2002    (JP) .............................. 2002-155089

(51) Int. Cl.
*G10L 21/00*    (2006.01)

(52) U.S. Cl. ............................................ 704/9; 704/10

(58) Field of Classification Search ...................... None
See application file for complete search history.

(56) References Cited

U.S. PATENT DOCUMENTS 6,986,104 B2* 1/2006 Green et al. ................ 715/523
7,027,975 B1* 4/2006 Pazandak et al. ............... 704/9

FOREIGN PATENT DOCUMENTS

| JP | 11-85755 | 3/1999 |
|---|---|---|
| JP | 2000-276431 | 10/2000 |
| JP | 2001-318919 | 11/2001 |
| JP | 2001-325280 | 11/2001 |
| JP | 2001-350753 | 12/2001 |
| JP | 2002-024214 | 1/2002 |

* cited by examiner

*Primary Examiner*—Susan McFadden
(74) *Attorney, Agent, or Firm*—Greer, Burns & Crain, Ltd.

(57) ABSTRACT

A cache processing unit searches a translated sentence cache file of a header matched with a translating request from a translated sentence cache database and transmits translated sentence cache data to a client. If the translated sentence cache file cannot be searched, the translated sentence cache file in which only the header matched with the translating request has been stored is preliminarily registered into the translated sentence cache database and, thereafter, a cache state is set into "during translation", thereby allowing a translation executing unit to machine-translate original sentence file. After completion of the machine translation, a translation result is transmitted to the client and stored into the translated sentence cache file which has preliminarily been registered, and the cache state is set into "available".

21 Claims, 17 Drawing Sheets

FIG. 5

| | | |
|---|---|---|
| 44 | URL | http://www.fujitsu.com |
| 46 | FILE UPDATE DATE | Wed, 27 Feb 2002 01:00:18 GMT |
| 48 | CACHE REFERENCE DATE | Wed, 27 Feb 2002 01:00:18 GMT |
| 50 | CACHE STATE | <AVAILABLE> OR <DURING TRANSLATION> |
| 52 | TRANSLATING DIRECTION | J |
| 54 | USE DICTIONARY LIST | OPTION1, OPTION2, USER1 |
| 56 | TRANSLATED SENTENCE CACHE DATA | HTTP/1.1 200 OK<br>Content-type: text/html<br>Content-length: 26062<br>Last-Modified: Wed, 27 Feb 2002 01:00:18 GMT<br><br><html><br><body><br>富士通<br></body><br></html> |

42

45-1 (rows 44–54)
45-2 (row 56)

```
HTTP/1.1 200 OK
Content-type: text/html
Content-length: 26062
Last-Modified: Wed, 27 Feb 2002 01:00:18 GMT <html>
<body>
FUJITSU
</body>
</html>
```

92 (header lines)
94 (body lines)

```
HTTP/1.1 200 OK
Content-type: text/html
Content-length: 26062
Last-Modified: Wed, 27 Feb 2002 01:00:18 GMT <html>
<body>
富士通
</body>
</html>
```

98 (header lines)
100 (body lines)

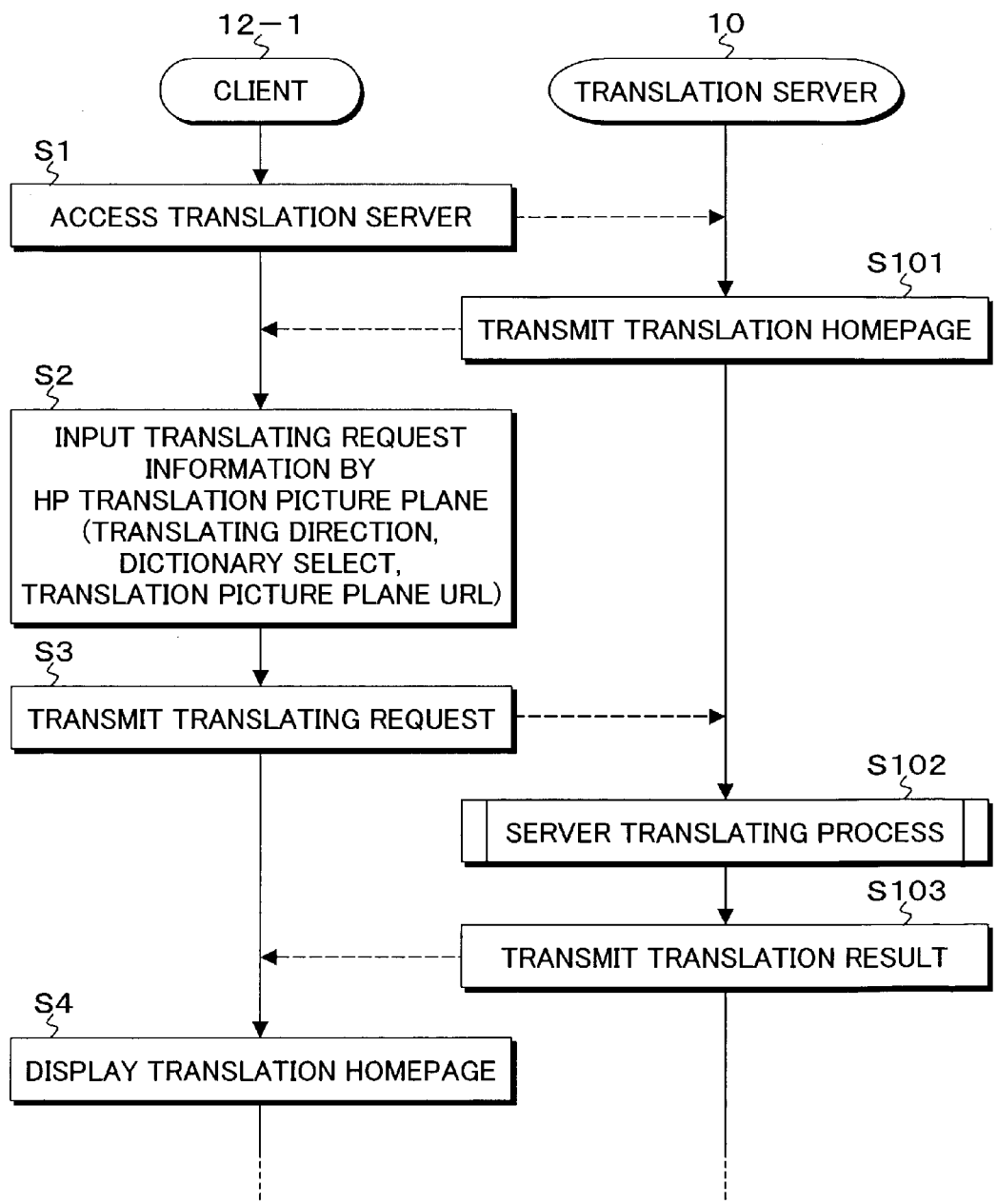

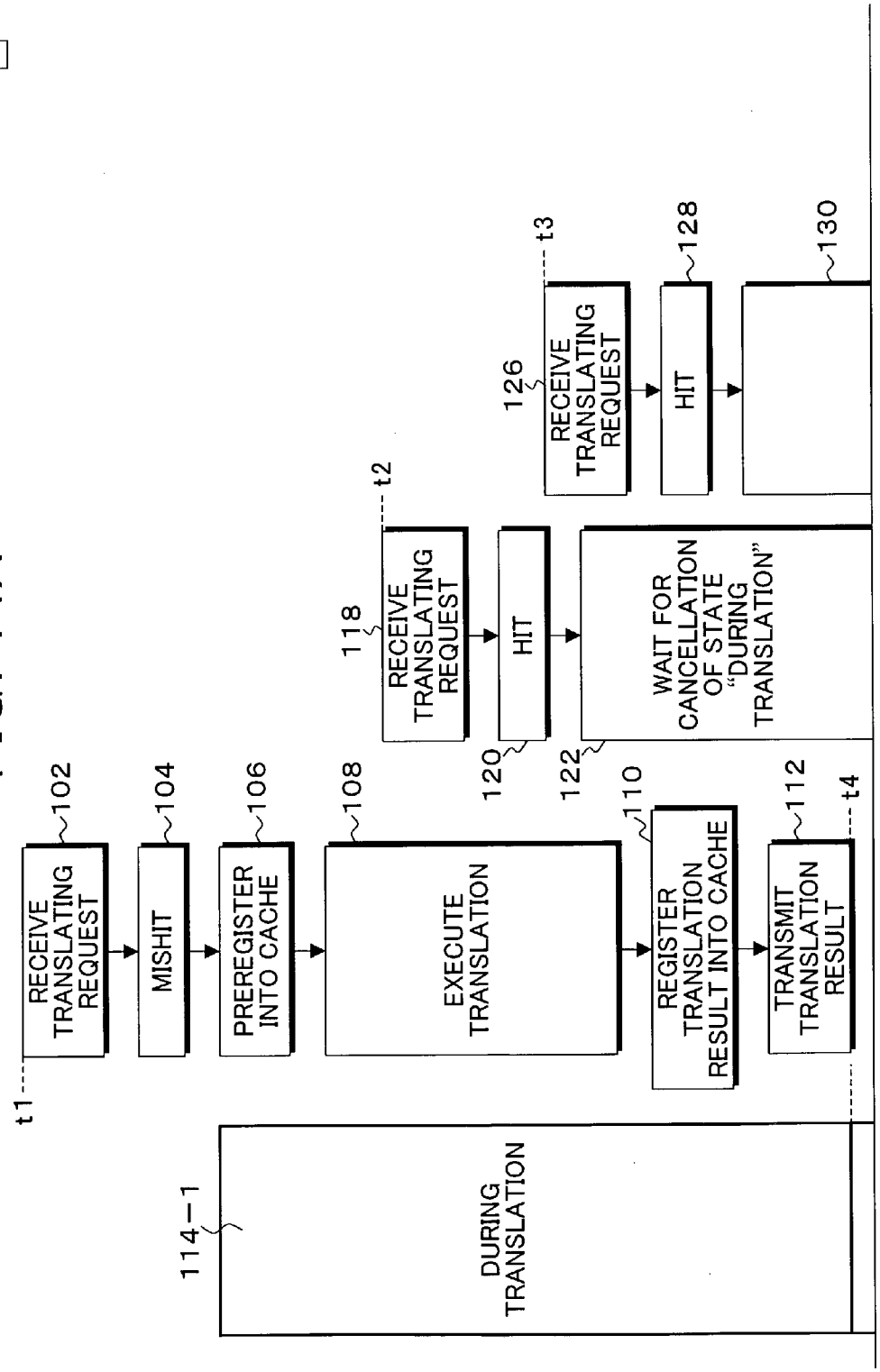

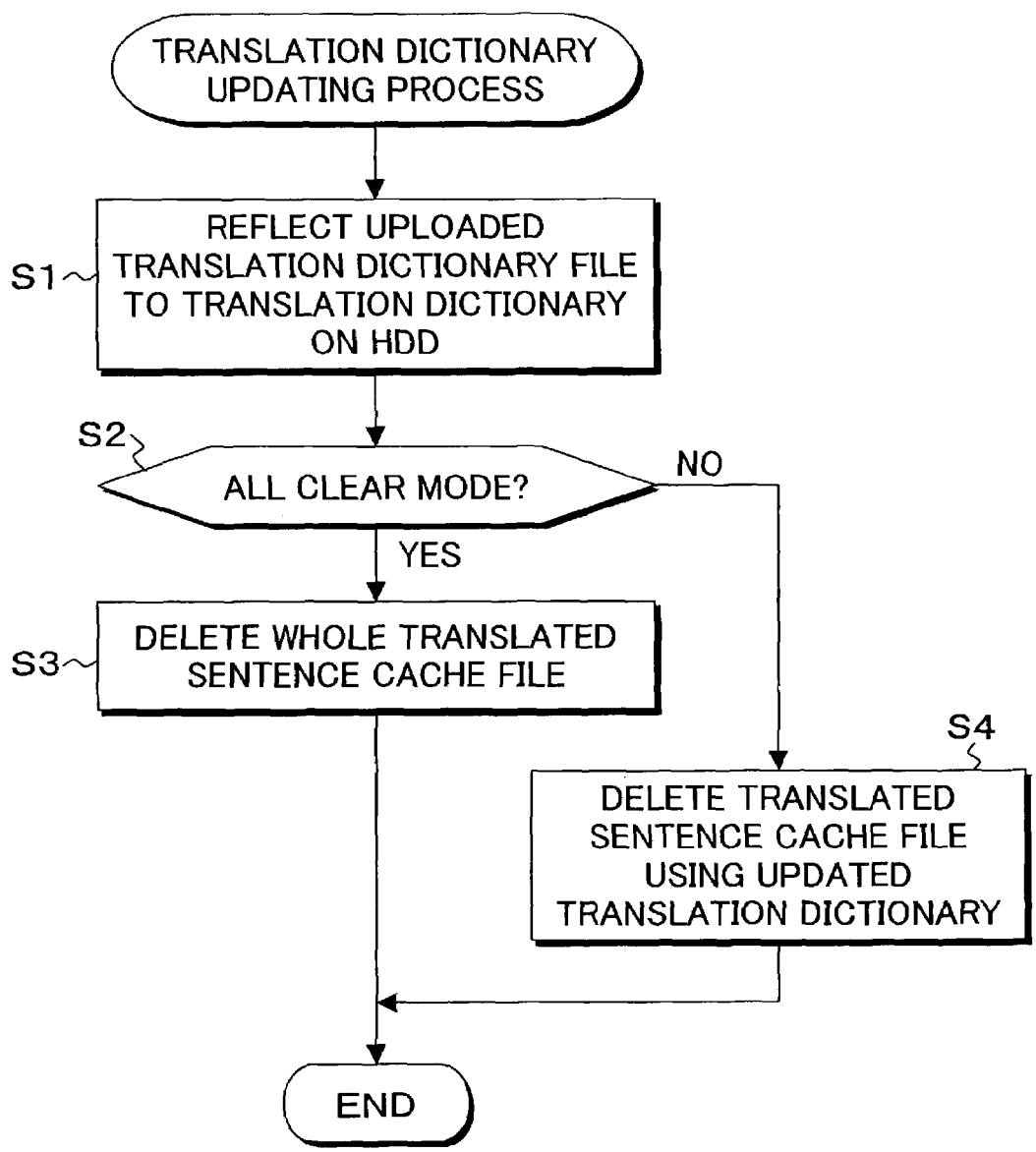

TRANSLATION SERVER, METHOD, AND PROGRAM UTILIZING AN UPDATED TRANSLATED SENTENCE CACHE DATABASE

BACKGROUND OF THE INVENTION

1. Field of the Invention

The invention relates to a translation server, a translating method, and a program for providing an automatic translation service via a network and, more particularly, to a translation server, a translating method, and a program for providing a translation service of a high speed by using a translated sentence cache.

2. Description of the Related Arts

In recent years, owing to the spread of the Internet technique represented by World Wide Web (hereinafter, referred to as "WWW") and E-mail, various kinds of information can be obtained without minding the national boundaries. Further, introduction of a network system into a company has widely been spread. Consequently, a case where a translation server having an automatic translating process which is advantageous in that client software is unnecessary and unitary management of dictionary maintenance can be made is introduced to the Intranet is increasing.

However, in the translation server arranged on a network such as Intranet or the like, if accesses are concentrated in a manner such that many translating requests are made to a specific homepage by the clients, an overload state such that a translating time becomes long often occurs. As a measure against such a load on the translation server, there are techniques such as parallelization of the translating process, caching by a proxy server, and the like. According to the parallelization of the translating process, even if the translating requests are concentrated, machine translation of Web pages obtained by simultaneously receiving a plurality of translating requests can be executed in parallel and the translating time can be reduced as compared with that in the case of a sequential process. However, also in the parallelization of the translating process, if an even larger number of translating requests are concentrated, it is difficult to cope with such a situation and there are limitations in the improvement of the translating time by the parallelization. The proxy server is an Internet server for controlling accesses by the clients to the Internet. By using the cache by the proxy server, the Web page which was accessed once as a request from the client is locally stored and, thereafter, the client obtains the Web page from the proxy server, thereby improving access performance. If a translation result of the translation server is stored as translated sentence cache data into the proxy server by using the cache by the proxy server as mentioned above, the translation server obtains the translation result from the proxy server in response to the translating request from the client and responds to the client, so that the translating time can be reduced. However, according to the machine translation in the translation server, although a translation dictionary of the user is properly updated in order to improve translation quality, in using the cache by the proxy server, even if the translation dictionary is updated by the translation server, the machine translation is not executed again with respect to the Web page of the translated sentence cache data which has already been stored in the proxy server. A problem such that the translation result by the updated translation dictionary cannot be obtained occurs.

SUMMARY OF THE INVENTION

According to the invention, a translation server and translating method and program in which a load on a translating process is reduced and, further, a translation result of an updated translation dictionary can be properly obtained are provided.

According to the invention, there is provided a translation server for providing a translating function to a client via a network, comprising: a translation user interface control unit which receives a translating request from a user interface provided for the client and activates a translating process; an original sentence obtaining unit which accesses an address designated in the translating request and obtains an original sentence file; a translation executing unit which executes machine translation of the original sentence file by using a translation dictionary designated in the translating request; and a cache processing unit which searches a translated sentence cache file of a header matched with the translating request from a translated sentence cache database and transmits translated sentence cache data to the client, and if the translated sentence cache file cannot be searched, preliminarily registers the translated sentence cache file in which only the header matched with the translating request has been stored into the translated sentence cache database, thereafter, sets a cache state into "during translation", allows the translation executing unit to translate the original sentence file, transmits a translation result to the client, stores the translation result into the translated sentence cache file which has preliminarily been registered, and sets the cache state into "available (can be used)". According to the invention as mentioned above, by providing a cache function for the translation server itself, the original sentence file obtained from the Web page to which the translating request has been made first is machine-translated. Since the translation result is held as a translated sentence cache file, in response to subsequent translating requests to the same Web page, it is sufficient to read out the translated sentence cache file and respond without machine-translating it. Even if accesses are concentrated on the same Web page, the translating time can be reduced. Particularly, in the cache process of the invention, prior to starting the machine translation of the original sentence file of the Web page designated in correspondence to the translating request, the translated sentence cache file is preliminarily registered into the translated sentence database, the cache state is set to "during translation", and the machine translation is executed. Therefore, when another translating request to the same Web page is received during the execution of the machine translation, it is determined that a cache hit occurred, and the translation server enters a waiting state for the empty cache. Consequently, even if another translating request is received during the execution of the machine translation, the execution of the parallel machine translation of the same original sentence file is prevented and a burden on the machine translation is reduced.

The translation user interface control unit provides a homepage translation picture plane which can input and designate the translating request to the browser of the client on the basis of a homepage translation HTML. Thus, the user as a client can easily input and designate the translating request by using the homepage translation picture plane.

When a size of the obtained original sentence file is smaller than the minimum size of the cache target, the cache processing unit does not execute the cache process but allows the translation executing unit to execute the machine translation. The cache target minimum size is a file size in which a time that is necessary for the machine translation exceeds a predetermined time that is necessary for the cache process. This is because also in the cache process, it takes a predetermined processing time until the translated sentence cache database is searched and transmitted to the client, and when the size of original sentence file is small, the cache process takes a longer time. Therefore, when the size of original sentence file is smaller than the predetermined size, by executing the machine translation, the translating time is reduced.

The translation user interface control unit receives a translating request including a URL of the original sentence file, an update date of the original sentence file, a translating direction, and a use dictionary list. The cache processing unit searches the translated sentence cache file of the header matched with the URL of the original sentence file, the update date of the original sentence file, the translating direction, and the use dictionary list obtained from the translating request from the translated sentence cache database. As mentioned above, by setting the URL of the original sentence file, the update date of the original sentence file, the translating direction, and the use dictionary list to header information of the translated sentence cache file, that is, cache parameters, even in the case of the same original sentence files, if the update dates are different, the machine translation is newly executed and those files are stored as different translated sentence cache files. If the used dictionaries of the users are different, the machine translation is newly executed and those files are stored as different translated sentence cache files. Thus, translation quality owing to the use of the translated sentence cache is remarkably improved. When another translating request to the same translated sentence cache file is received in the cache state of "during translation" after the translated sentence cache files were preliminarily registered, the cache processing unit allows the cache process of such another translating request to be waited until the cache state enters "available". Therefore, the parallel machine translation of the same original sentence file is prevented and, at the same time, by allowing the translation result by the first machine translation to cache-respond to the subsequent same translating request, the translating time that is necessary when the accesses are concentrated on the same Web page is reduced. The translation server of the invention further comprises a dictionary updating unit which updates the translation dictionaries and, when the dictionaries are updated, clears all or a part of the translated sentence cache files registered in the translated sentence cache database. Thus, after the dictionaries are updated, the translation result using the updated translation dictionaries can be certainly obtained.

According to the invention, a translating method of a translation server which provides a translating function to the client via a network is provided. This translating method comprises:

a translating request receiving step wherein a translating request from a user interface provided for the client is received and a translating process is activated by a translation user interface control unit;

an original sentence obtaining step wherein an address designated in the translating request is accessed and an original sentence file is obtained by an original sentence obtaining unit; and a cache processing step wherein a translated sentence cache file of a header matched with the translating request is searched from a translated sentence cache database, translated sentence cache data is transmitted to the client, if the translated sentence cache file cannot be searched, the translated sentence cache file in which only the header matched with the translating request has been stored is preliminarily registered into the translated sentence cache database, thereafter, a cache state is set into "during translation", a translation executing unit is allowed to translate the original sentence file, a translation result is transmitted to the client, the translation result is stored into the translated sentence cache file which has preliminarily been registered, and the cache state is set into "available".

According to the invention, a program which is executed by a translation server which provides a translating function to the client via a network is provided. This program allows a computer to execute:

a translating request receiving step wherein a translating request accompanied with a translating request from a user interface provided for the client is received and a translating process is activated;

an original sentence obtaining step wherein an address designated in the translating request is accessed and an original sentence file is obtained; and a cache processing step wherein a translated sentence cache file of a header matched with the translating request is searched from a translated sentence cache database, translated sentence cache data is transmitted to the client, if the translated sentence cache file cannot be searched, the translated sentence cache file in which only the header matched with the translating request has been stored is preliminarily registered into the translated sentence cache database, thereafter, a cache state is set into "during translation", a translation executing unit is allowed to translate the original sentence file, a translation result is transmitted to the client, the translation result is stored into the translated sentence cache file which has preliminarily been registered, and the cache state is set into "available".

Details of the transmitting method and the program in the invention are fundamentally the same as those in the case of the translation server.

The above and other objects, features, and advantages of the present invention will become more apparent from the following detailed description with reference to the drawings.

BRIEF DESCRIPTION OF THE DRAWINGS

FIG. 5 is an explanatory diagram of a translated sentence cache file in FIG. 4;

FIGS. 11A and 11B are explanatory diagrams of HTML sources (original sentence files) which are obtained by the translation server of the invention and their translated sentences;

FIG. 12 is a time chart of a processing procedure of the client and the translation server in the invention;

FIGS. 14A and 14B are time charts of the cache processing operation in the case of executing a cache preliminary registration prior to the machine translation by the translation server of the invention;

FIG. 16 is a flowchart for a translation dictionary updating process in the translation server of the invention.

DETAILED DESCRIPTION OF THE PREFERRED EMBODIMENT

Figure 1:
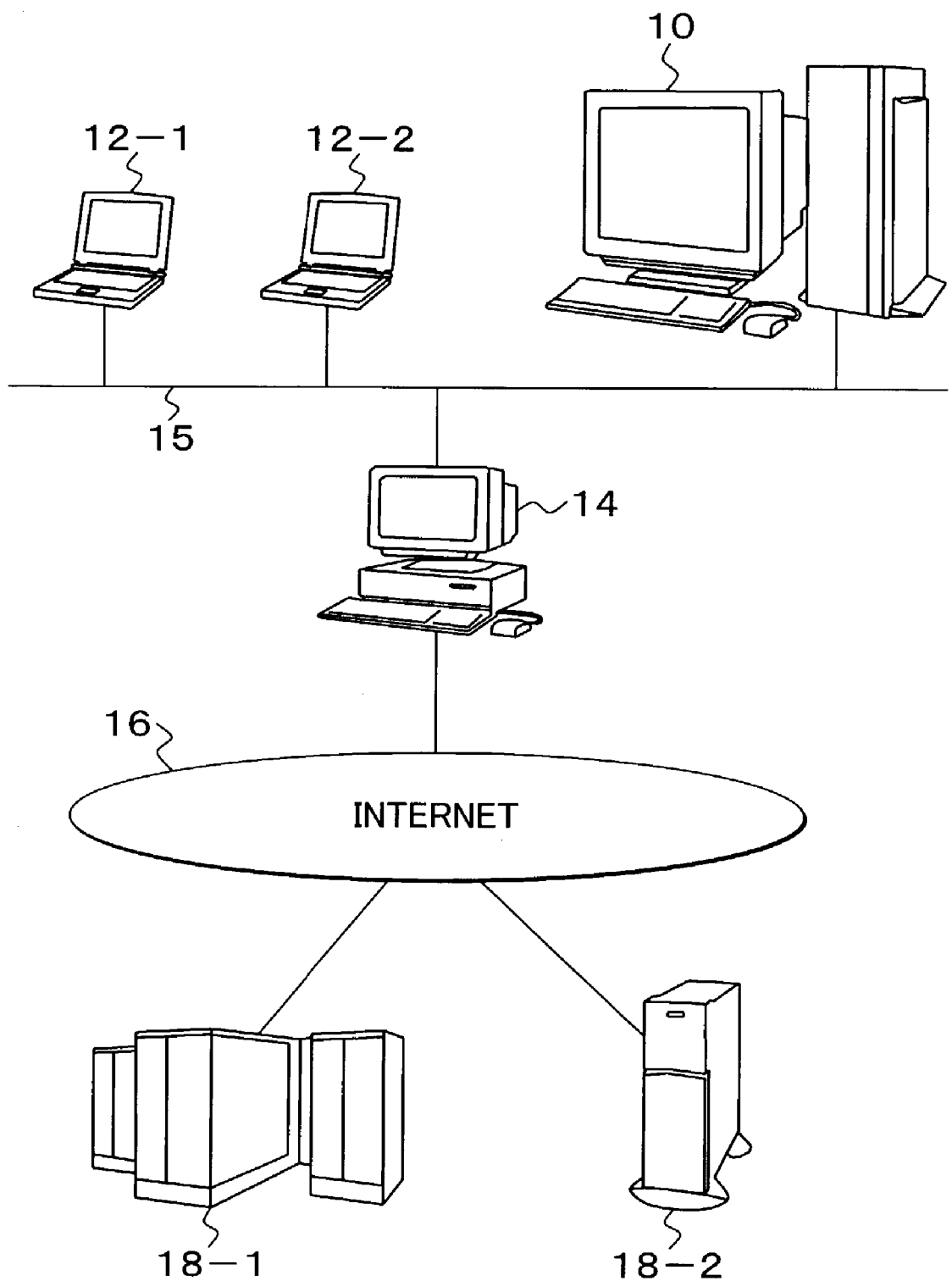
FIG. 1 is an explanatory diagram of a system environment in which a translation server of the invention has been installed.

FIG. 1 is an explanatory diagram of a system environment in which a translation server of the invention has been installed. In FIG. 1, a translation server 10 according to the invention is connected to an LAN 15 constructing the Intranet of a company or the like. Clients 12-1 and 12-2 which are used by a requestor who uses the translation server 10 are connected to the LAN 15. A proxy server 14 which functions as an Internet control server is connected to the LAN 15. The translation server 10 and the clients 12-1 and 12-2 connected to the LAN 15 can access an external Internet 16 via the proxy server 14. WWW contents servers 18-1 and 18-2 which open HTML data including text information such as a Web page or the like serving as a target of translating request from the clients 12-1 and 12-2 to the translation server 10 are connected onto the Internet 16. When an original sentence is obtained, the translation server 10 uses a cache function of the proxy server 14. However, when translated sentence data is returned, the translation server 10 acts on the proxy server 14 so as not to be cached. That is, when the translation server 10 obtains the original sentence data via the proxy server 14, if the original sentence data has been cached in the proxy server 14, the original sentence data reaches from the proxy server 14 and the translation server 10 translates it. When translated sentence data is returned to the client side, for example, information of "Cache-Control: no-cache" and "Pragma: no-cache" is added to an HTTP header, thereby preventing the translated sentence data from being cached into the proxy server 14.

Figure 2:
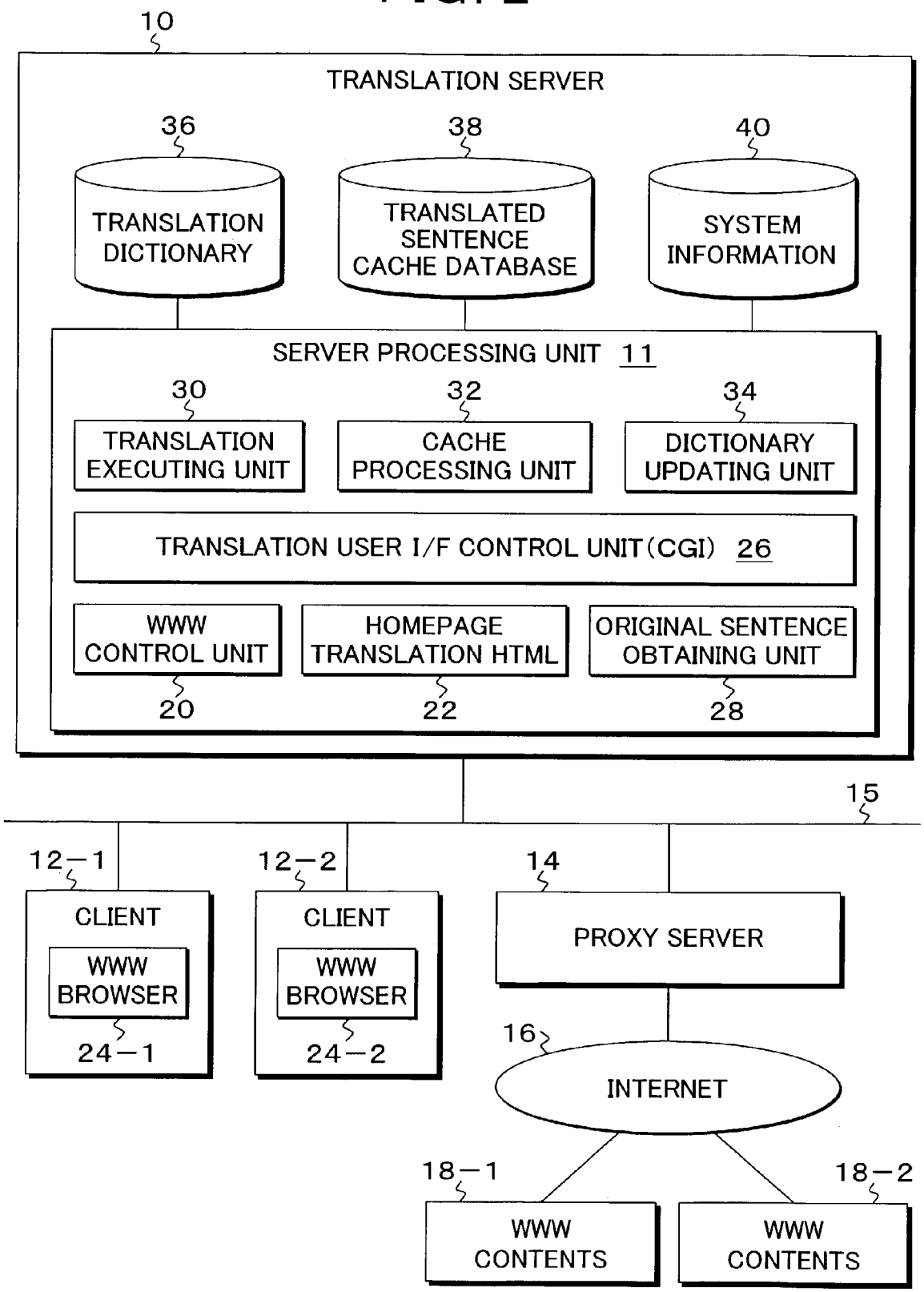
FIG. 2 is a block diagram of the system environment including a functional construction of the translation server in FIG. 1.

FIG. 2 is a block diagram of the system environment including a functional construction of the translation server 10 in FIG. 1. In FIG. 2, a server processing unit 11 is provided for the translation server 10. The server processing unit 11 is usually realized by a WWW server function and an application server function. Functions of a WWW control unit 20, a homepage translation HTML 22, a translation user interface control unit 26, an original sentence obtaining unit 28, a translation executing unit 30, a cache processing unit 32, and a dictionary updating unit 34 are provided for the server processing unit 11. A translation dictionary 36 which is used in the translation executing unit 30, a translated sentence cache database 38 which is used in the cache processing unit 32, and further, system information 40 are provided for the server processing unit 11. On the other hand, WWW browsers 24-1 and 24-2 are provided for the clients 12-1 and 12-2 serving as translation requesting sides. By accessing the translation server 10, a homepage translation picture plane as a user interface is obtained and a translating request is made.

Subsequently, each processing function provided for the server processing unit 11 of the translation server 10 will be described. The WWW control unit 20 controls a network connection from the WWW browsers 24-1 and 24-2 of the clients 12-1 and 12-2 or the like. The homepage translation HTML 22 is an HTML source for displaying the homepage translation picture plane which can input and designate the translating request to the WWW browsers 24-1 and 24-2 of the clients 12-1 and 12-2. The translation user interface control unit 26 receives the translating request which is made when a translate button is clicked on the homepage translation picture plane displayed by the WWW browsers 24-1 and 24-2 of the clients 12-1 and 12-2 and activates a translating process. In the embodiment, the translation user interface control unit 26 uses a CGI (Common Gateway Interface). The CGI constructing the translation user interface control unit 26 is a Web server program processing function which can be activated from the WWW browsers 24-1 and 24-2 of the clients 12-1 and 12-2 and is a program which can display the homepage translation picture plane to the clients 12-1 and 12-2 side by the homepage translation HTML 22 and receive the translating request using the homepage translation picture plane. The translation server function program which functions as a translation user interface control unit 26 is not limited to the CGI but can be JSP (Java Server Pages), ASP (Active Server Pages), or the like. The original sentence obtaining unit 28 obtains an original sentence HTML source existing in the URL of the requested Web page in response to the translating request from the clients 12-1 and 12-2 side. In the original sentence HTML file obtained by the original sentence obtaining unit 28, the HTML and the text data are expressed in, for example, English. The translation server 10 obtains this original sentence HTML and executes a translating process for translating it from English into Japanese in the translating direction designated in the translating request. The translation executing unit 30 executes machine translation of the HTML or the text data obtained by the original sentence obtaining unit 28 in the translating direction (from English into Japanese or from Japanese into English) designated in the translating request and in accordance with the selection and designation of the translation dictionary 36. The cache processing unit 32 compares a size of original sentence with a preset cache target minimum size and allows the translation executing unit 30 to execute the machine translation if the original sentence size is smaller than the cache target minimum size. If the original sentence size is equal to or larger than the cache target minimum size, the cache processing unit 32 executes the cache process. In the cache process which is executed by the cache processing unit 32, the coincident translated sentence cache file is searched and extracted from the translated sentence cache database 38 on the basis of the following four cache header information (cache parameters):

(1) URL of the original sentence
(2) File update date
(3) Translating direction of the translating request
(4) Use dictionary list In the translated sentence cache files in the translated sentence cache database 38, "available" or "during translation" has been set as a cache state. If the cache state is "available", data in the searched translated sentence cache file can be sent to the client on a translation requesting source side. If the matched translated sentence cache file cannot be searched from the translated sentence cache database 38 in response to the translating request from the client side, it is regarded that a cache mishit occurred. In this case, the machine translation of the original sentence file is executed by the translation executing unit 30. In the case of starting the machine translation of the original sentence file by the translation executing unit 30 on the basis of a discrimination result of the cache mishit as mentioned above, in the cache processing unit 32 of the invention, the translated sentence cache file of the original sentence file whose translation is not finished yet is preliminarily formed and its cache state is preliminarily registered as "during translation" into the translated sentence cache database 38. "Preliminary registration" denotes that the translated sentence cache file in which the translated sentence cache data is not stored is registered. Therefore, when the translated sentence cache file which is matched with the translating request is extracted from the translated sentence cache database 38, if its cache state is "during translation", since the translated sentence cache data as a translation result is not stored in this translated sentence cache file and the machine translation is at present being executed in the translation executing unit 30. Therefore, it is possible to wait until the machine translation is finished, the storage of the translated sentence cache data is finished, and the cache state becomes "available". It is also possible to construct in a manner such that in the waiting state in the case where the cache state is "during translation", the cache state is again referred to after waiting for a predetermined time or a storage completion message indicative of the completion of the storage of the translation result into the translated sentence cache file is received from the translation executing unit 30 and the cache data is transmitted to the client side. The dictionary updating unit 34 stores an optional dictionary updated at proper timing, an updated user dictionary, or the like into the translation dictionary 36 and updates it. When the dictionary is updated, the translated sentence cache database 38 is cleared. When the translated sentence cache database 38 is cleared at the time of updating the dictionary, either a mode of clearing all of the translated sentence cache files or a mode of clearing only the translated sentence cache file using the translation dictionary as an updating target can be selected.

Figure 3:
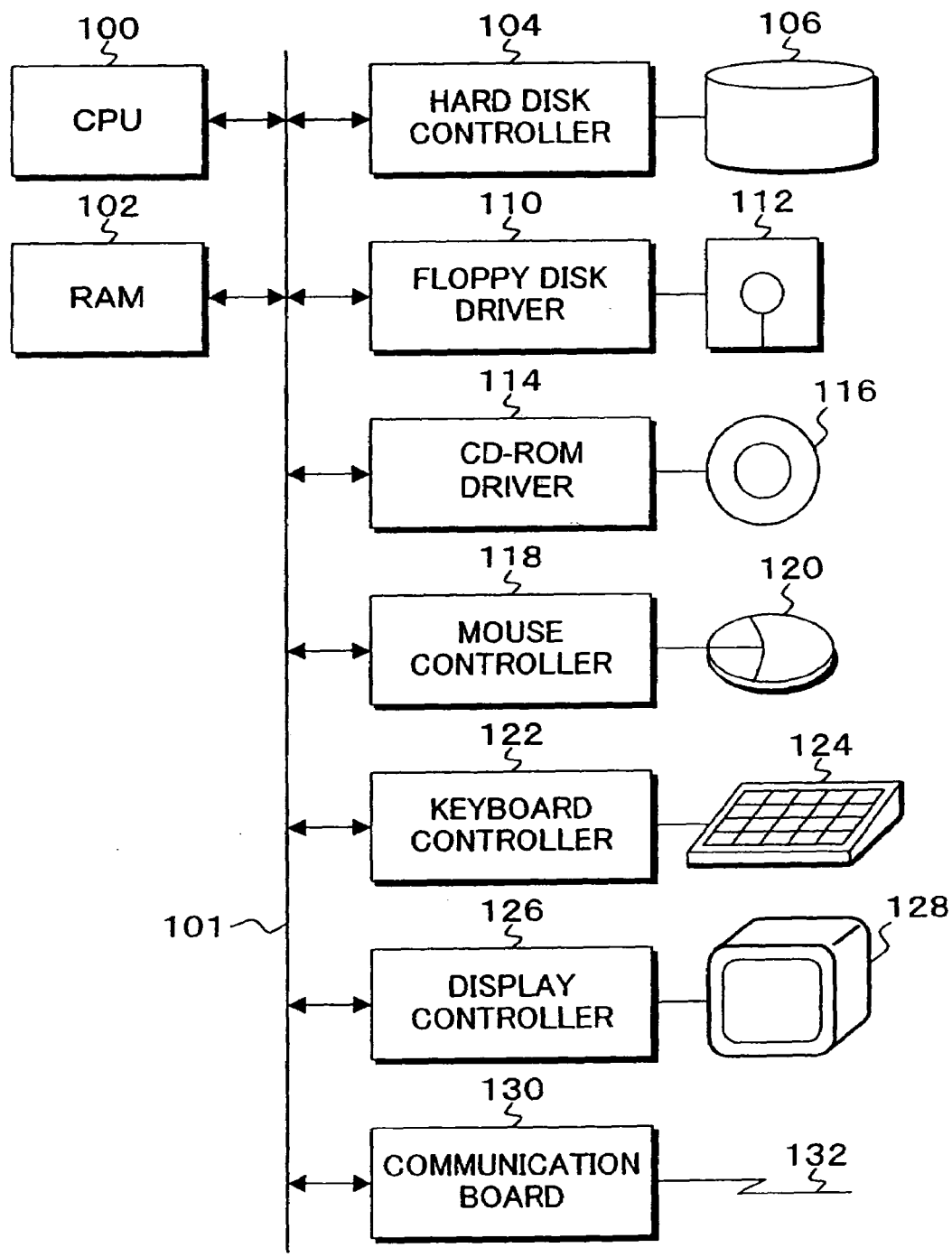
FIG. 3 is an explanatory diagram of a hardware environment of a computer which is applied to the translation server in FIG. 2.

The translation server 10, clients 12-1 and 12-2, and proxy server 14 in FIGS. 1 and 2 are realized by, for example, hardware resources of a computer as shown in FIG. 3. In the computer in FIG. 3, a RAM 102, a hard disk controller (software) 104, a floppy disk driver (software) 110, a CD-ROM driver (software) 114, a mouse controller 118, a keyboard controller 122, a display controller 126, and a board 130 for communication are connected to a bus 101 of a CPU 100. The hard disk controller 104 connects a hard disk drive 106, reads out a necessary program from the hard disk drive 106 upon activation of the computer, develops it onto the RAM 102, and executes it by the CPU 100. A floppy disk drive (hardware) 112 is connected to the floppy disk driver 110 and can read and writes data from/to a floppy disk (R). A CD drive (hardware) 116 is connected to the CD-ROM driver 114 and can read data and programs stored in a CD. The mouse controller 118 transfers the inputting operation of a mouse 120 to the CPU 100. The keyboard controller 122 transfers the inputting operation of a keyboard 124 to the CPU 100. The display controller 126 displays a message to a display unit 128. The communicating board 130 communicates with another computer or a personal assistant by using a communication line 132 including wireless means.

Figure 4:
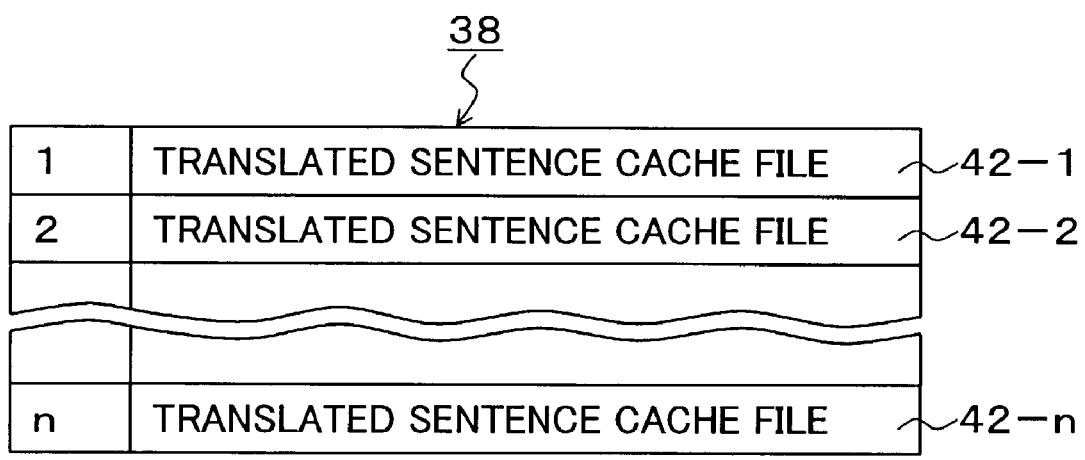
FIG. 4 is an explanatory diagram of a translated sentence cache database in FIG. 2.

FIG. 4 is an explanatory diagram of the translated sentence cache database 38 provided for the translation server 10 in FIG. 2. Translated sentence cache files 42-1 to 42-n have been separately stored as indices 1, 2, . . . , and n in the translated sentence cache database 38.

FIG. 5 shows contents of one (42) of the translated sentence cache files (42-1 to 42-n) stored in the translated sentence cache database 38 in FIG. 4. The translated sentence cache file 42 is constructed by a header 45-1 and a body 45-2. Information which is used as cache parameters is included in the header 45-1. That is, a URL 44, a file update data 46, a cache reference date 48, a cache state 50, a translating direction 52, and a use dictionary list 54 have been stored in the header 45-1. Among them, the URL 44, translating direction 52, and use dictionary list 54 are obtained from translating request information received by the translating request from the client side. The file update data 46 is obtained from the original sentence file accessed from the Internet by the URL 44. Translated sentence cache data 56 is stored in the body 45-2.

Figure 6:
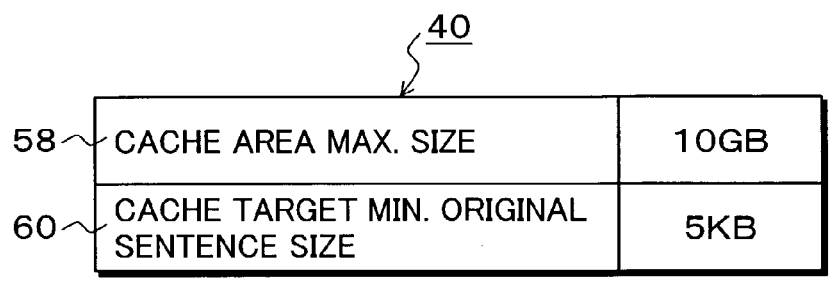
FIG. 6 is an explanatory diagram of system information in FIG. 2.

FIG. 6 is an explanatory diagram of the system information 40 provided for the translation server 10 in FIG. 2. The system information 40 includes a cache area maximum size 58 and a cache target minimum original sentence size 60. The cache area maximum size 58 designates the maximum size of a cache area on the memory which can be used as a translated sentence cache database 38 in the translation server 10. In this example, the cache area maximum size 58 is set to 10 GB. The cache target minimum original sentence size 60 designates a file size of the original sentence file serving as a reference to discriminating whether the cache process is executed by the cache processing unit 32 or the machine translation is executed by the translation executing unit 30. In this example, the cache target minimum original sentence size 60 is set to 5 kB. That is, if the size of the original sentence file is smaller than 5 kB, the machine translation is executed by the translation executing unit 30. If the size of the original sentence file is equal to or larger than 5 kB, the cache process is executed. This is because processing performance of the translation executing unit 30 for executing the recent machine translation is improved and, in the case of the original sentence file of a small size, the translation result can be obtained for a time shorter than that for the cache process. Therefore, in the original sentence file of a small size, since the processing time in the case of executing the machine translation can be reduced than that for the cache process, the original sentence file whose size is equal to or larger than the cache target minimum original sentence size is set to the target of the cache process and the original sentence file of a small size is machine-translated, thereby improving the whole translation processing performance.

Figure 7:
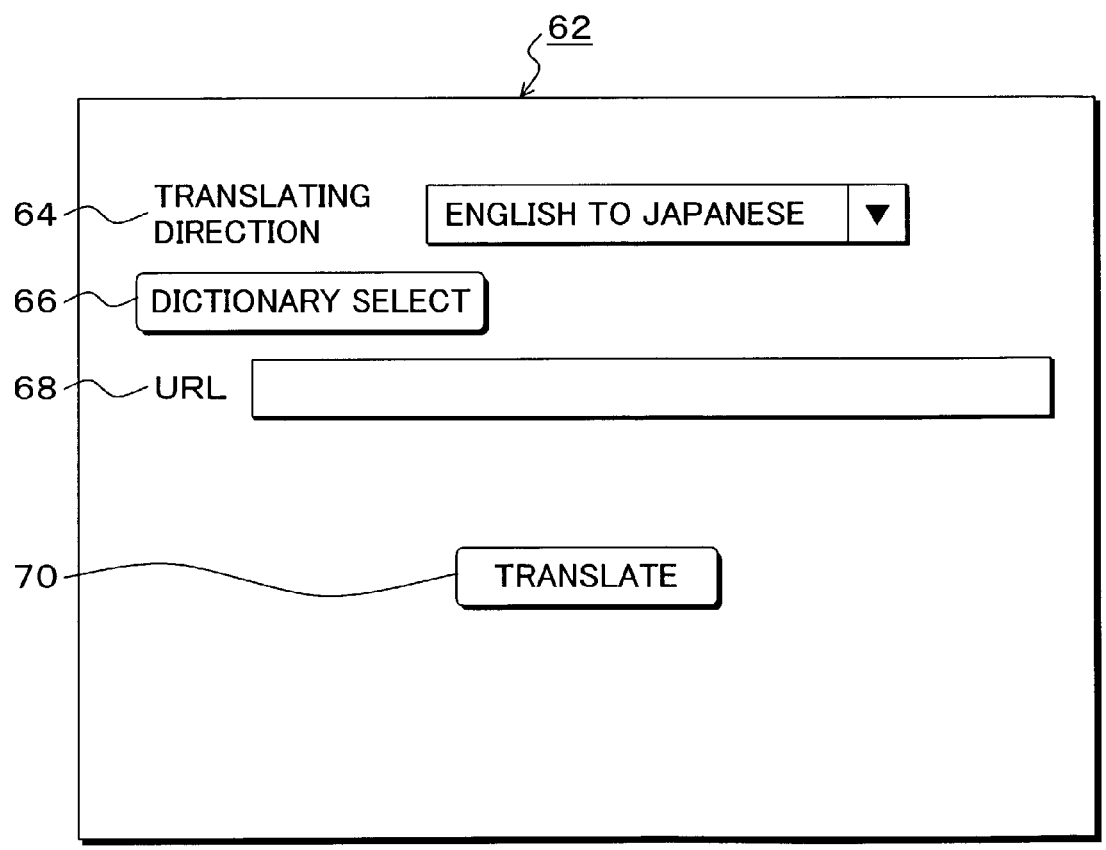
FIG. 7 is an explanatory diagram of a homepage translation picture plane which is provided to clients by the translation server of the invention.
Figure 8:
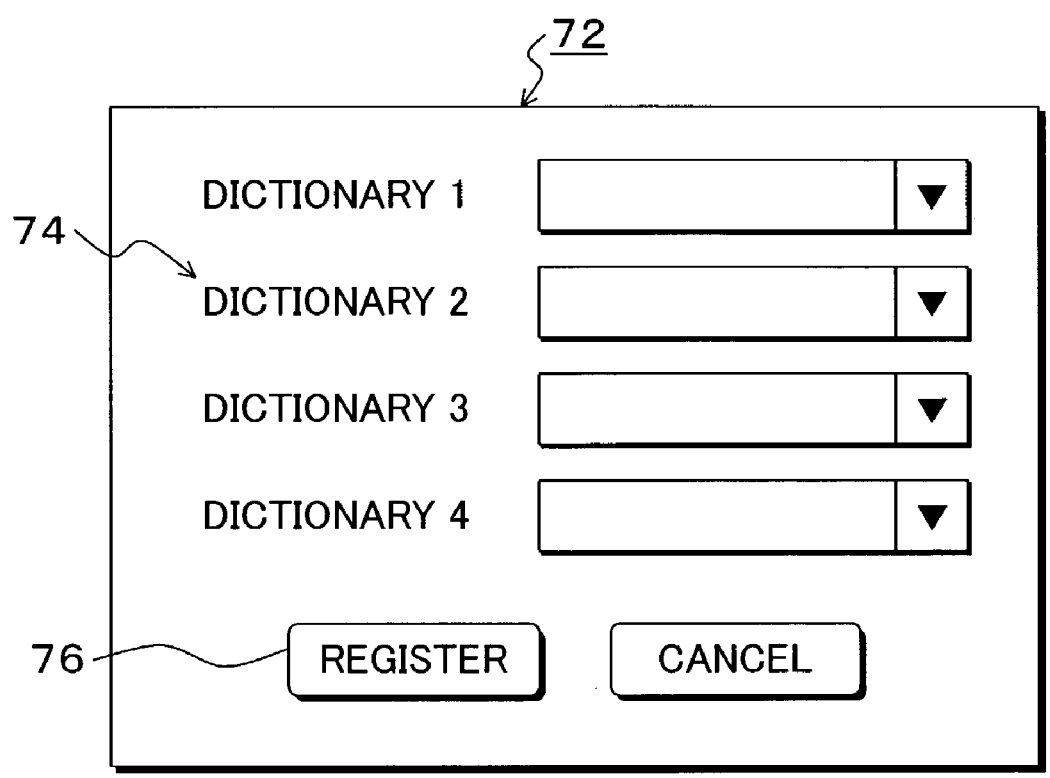
FIG. 8 is an explanatory diagram of a dictionary selection picture plane opened as a pull-down menu from FIG. 6.

FIG. 7 is an explanatory diagram of a homepage translation picture plane 62 which is provided and displayed to the WWW browsers 24-1 and 24-2 of the clients 12-1 and 12-2 by the CGI of the translation user interface control unit 26 on the basis of the homepage translation HTML 22 in FIG. 2. The homepage translation picture plane 62 has a translating direction designating unit 64, a dictionary selecting unit 66, a URL designating unit 68, and a translate button 70. By opening a dialog, the translating direction designating unit 64 can designate the translating direction "English to Japanese" or "Japanese to English". By clicking the dictionary selecting unit 66, for example, a dictionary selecting picture plane 72 can be opened as, for example, a pull-down menu as shown in FIG. 8. A dictionary menu 74 of special dictionaries and user dictionaries which can be used is displayed like, for example, "dictionary 1" to "dictionary 4" onto the dictionary selecting picture plane 72. After the dialog of each dictionary menu is opened and the necessary dictionary is selected, by pressing a register button 76, selected contents are determined and a display screen is returned to the homepage translation picture plane 62 in FIG. 7. When the dictionary is selected once on the dictionary selecting picture plane 72 in FIG. 8, a selection result of the dictionary is usually stored as request information of the browser and the selection result of the dictionary can be reflected at the subsequent times. If the WWW control unit 20 in FIG. 2 can be session-managed, the dictionary selection result can be stored as session information on the translation server 10 side. Further, the selecting order of the translation dictionaries can be used as priorities of determination of translation words at the time of translating the original sentence file. Subsequently to the dictionary selecting unit 66, the URL designating unit 68 is provided for the homepage translation picture plane 62 in FIG. 7. The translation user inputs the URL on the Internet serving as a destination for obtainment of the original sentence file into the URL designating unit 68. After completion of the input setting to the translating direction designating unit 64, dictionary selecting unit 66, and URL designating unit 68 in this manner, by operating the translate button 70, the translating request can be transmitted from the client side to the translation server 10 side.

Figure 9:
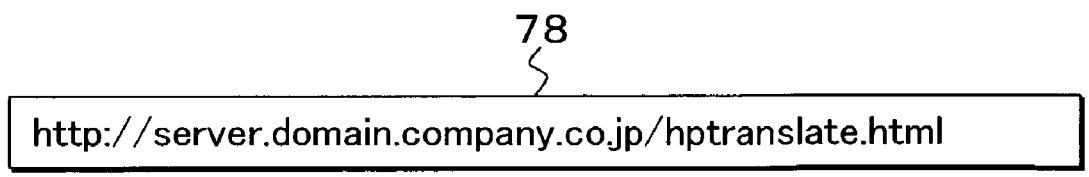
FIG. 9 is an explanatory diagram of a URL of the homepage translation picture plane in the translation server in FIG. 2.

FIG. 9 shows an example of a URL 78 for accessing the homepage translation picture plane which is provided by the translation server 10 in FIG. 2. For example, by accessing the LAN 15 from the client 12-1 in FIG. 2 by the URL 78 on the homepage translation picture plane, the client 12-1 is connected to the WWW control unit 20 of the translation server 10 and, for example, the homepage translation picture plane 62 as shown in FIG. 7 can be displayed by the WWW browser 24-1 on the basis of the homepage translation HTML 22.

Figure 10:
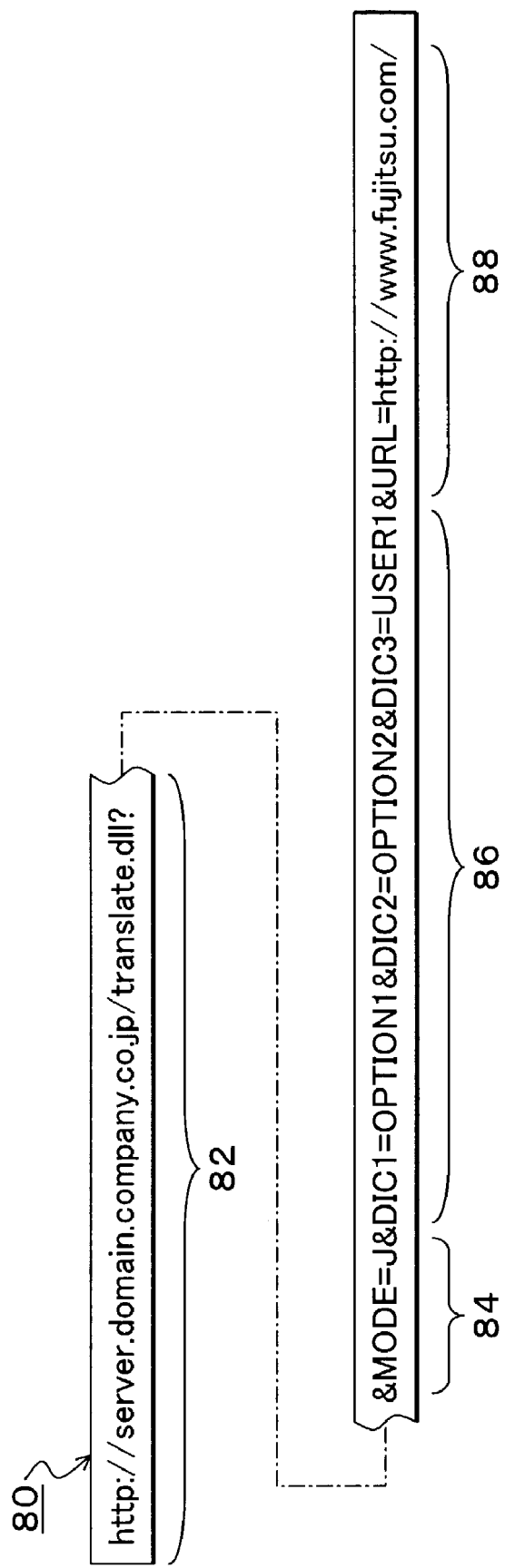
FIG. 10 is an explanatory diagram of translating request information which is transmitted from the client to the translation server.

FIG. 10 is an explanatory diagram of a translating request URL 80 which is transmitted to the translation server 10 when the translate button 70 is pressed after completion of the input setting by the homepage translation picture plane 62 in FIG. 7. In the translating request URL 80, a translating direction 84, a dictionary selection 86, and an original sentence file URL 88 constructing the translating request information are added to a translating process CGI file name 82.

FIG. 11A shows an example of an HTML source 90 as a general original sentence file obtained from a contents server on the Internet by the original sentence file URL 88 added as translating request information to the translating request URL 80 in FIG. 10. The HTML source 90 is constructed by a message header 92 and a message body 94. In the invention, in the HTML source 90 as an original sentence file, information of a file update date "Last-Modified" in the message header 92 is used as one of the cache parameters. Text data in the message body 94 is translated as a target. A translated sentence HTML source 96 as shown in FIG. 11B is formed and sent to the client side.

FIG. 12 is a time chart of a procedure for a translating process between the translation server 10 and, for example, the client 12-1 in FIG. 2. When the client 12-1 accesses the translation server 10 in step S1 in order to perform homepage translation of, for example, the WWW contents server 18-1 connected to the Internet 16, the translation server 10 transmits the translation homepage to the client 12-1 in step S101 in response to the access and allows it to be displayed. In the client 12-1 which received the translation homepage provided from the translation server 10 in this manner, when the translating direction, the dictionary selection, and the translation picture plane URL are inputted and designated as translating request information by the homepage translation picture plane and the translate button is pressed in step S2, the translating request is sent to the translation server 10 in step S3. In response to the translating request from the client 12-1, the translation server 10 executes a server translating process in step S102 and transmits a translation result to the client 12-1 in step S103. The client 12-1 displays the translation homepage.

Figure 13A:
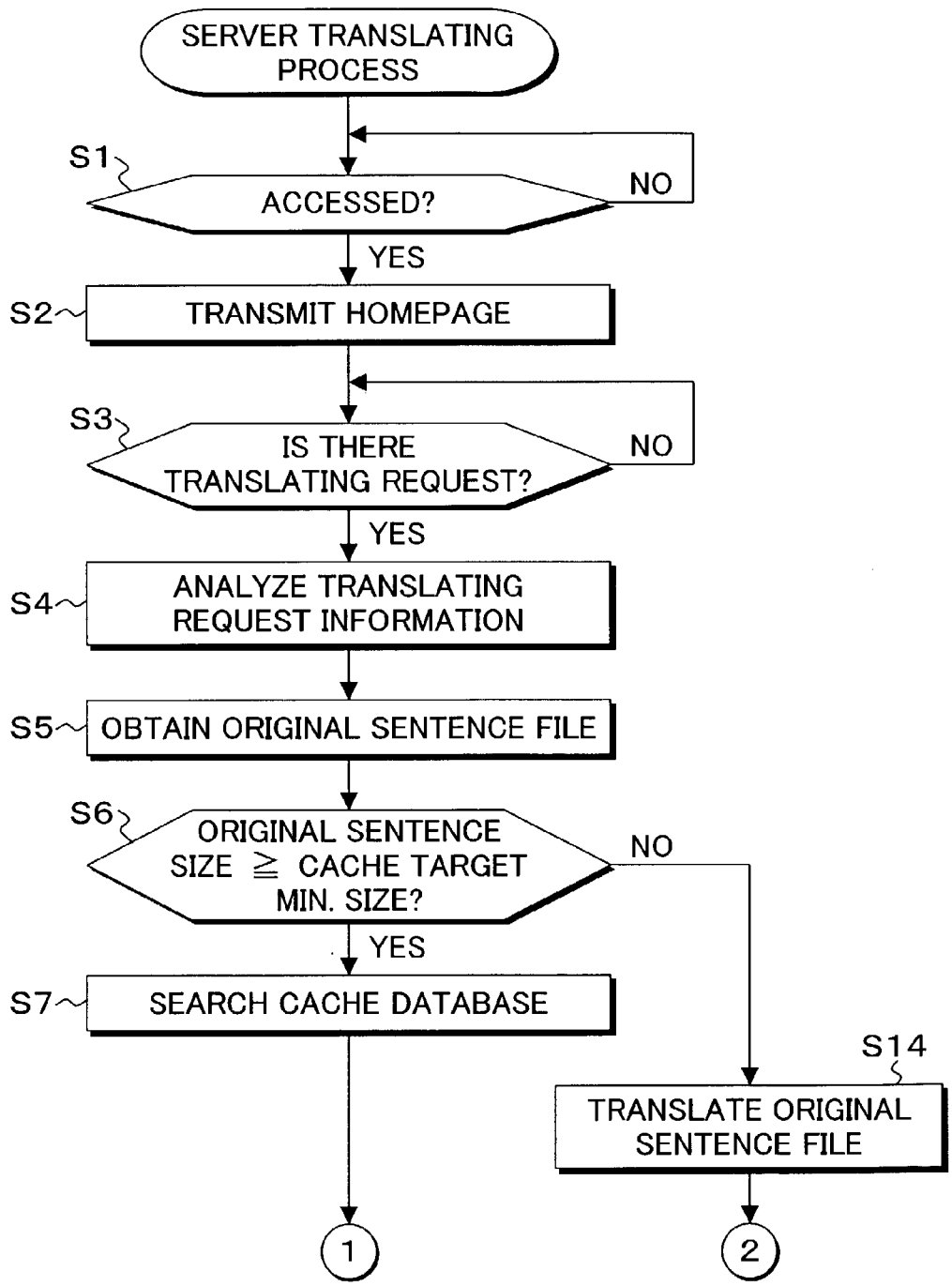
FIGS. 13A and 13B are flowcharts for a server translating process according to the invention.
Figure 13B:
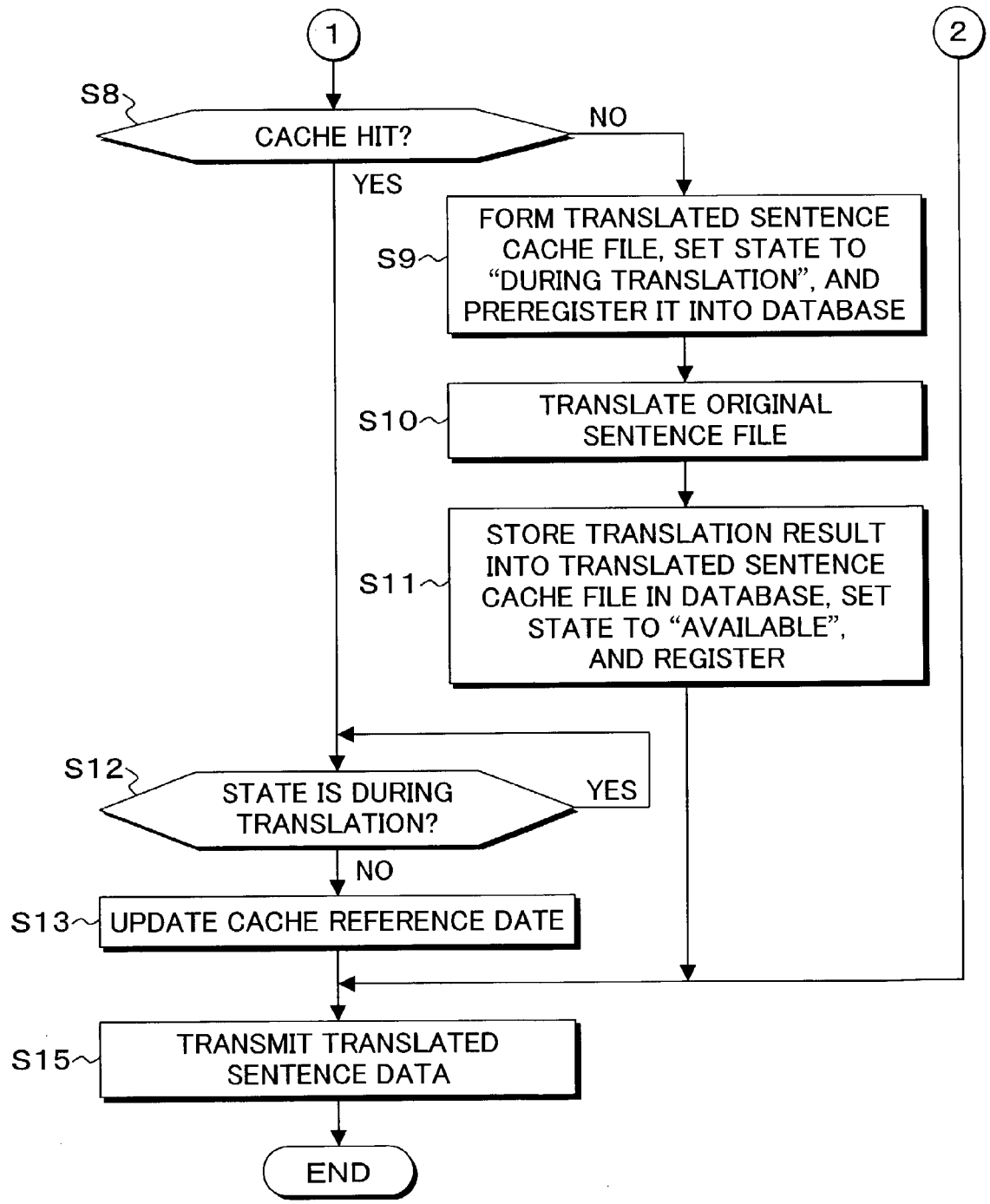

FIGS. 13A and 13B are flowcharts for the server translating process in the translation server 10 in FIG. 2 and simultaneously show a processing procedure of a program which is executed by the translation server 10. In FIGS. 13A and 13B, when an access from the client is received by the WWW control unit 20 in step S1, the homepage translation HTML 22 is formed by the CGI of the translation user interface control unit 26. In step S2, the homepage translation HTML 22 is transmitted as an HTML source to the client side and the homepage translation picture plane 62 as shown in FIG. 7 is displayed. Therefore, on the client side, the translating direction, the dictionary selection, and the original sentence file URL are inputted and designated by the homepage translation picture plane 62 as shown in FIG. 7 and the translate button 70 is pressed, so that the translating request URL 80 having, for example, format contents in FIG. 10 is received in step S3. When the translating request from the client is received, the CGI of the translation user interface control unit 26 is activated. The received translating request information is analyzed in step S4. Subsequently, in step S5, the original sentence obtaining unit 28 accesses, for example, the WWW contents server 18-1 of the Internet 16 via the proxy server 14 by using the original sentence file URL 88 obtained from the translating request information, thereby obtaining the HTML source 90 as shown in, for example, FIG. 11A as an original sentence file. In next step S6, the cache processing unit 32 discriminates whether the size of the obtained original sentence file is equal to or larger than the cache target minimum original sentence size or not. If the cache target minimum original sentence size is equal to, for example, 5 kB similar to that of the system information 40 in FIG. 6 and the size of original sentence is equal to or larger than 5 kB, step S7 follows. The translated sentence cache file which coincides with the original sentence file serving as a target of the translating request is searched from the translated sentence cache database 38. This search is executed by comparing the original sentence information and the translating request information with the header information of the translated sentence cache file stored in the translated sentence cache database 38. This comparison is executed as follows in an example of the case where, for example, the translating request URL 80 in FIG. 10 and the HTML source 90 serving as an original sentence file in FIG. 11A are compared with the header 45-1 of the translated sentence cache file 42 in FIG. 5.

(1) The "URL 44" of the translated sentence cache is compared with the URL which obtained the original sentence.

(2) The "file update data 46" of the translated sentence cache is compared with "Last-Modified" of the original sentence file.

(3) The "translating direction 52" of the translated sentence cache is compared with the "translating direction 84" of the translating request information.

(4) The "use dictionary list 54" of the translated sentence cache is compared with the "dictionary selection 86" of the translating request information.

If all of the comparison results indicate the coincidence by the comparison of the above items (1) to (4), it is determined in step S8 that a cache hit occurred. Step S12 follows. If at least one of the comparison results indicates the dissidence by the comparison of the above items (1) to (4), step S9 follows and the machine translation of the original sentence file is executed. In the comparison of the use dictionaries of the item (4), if there are priorities upon translation, the order of the "use dictionary list 54" is compared with that of the "dictionary selection 86". If they coincide, it is determined that the cache hit occurred. If there is no priority, when the combinations are matched, it is determined that the cache hit occurred. Upon machine translation of the original sentence file, first, the translated sentence cache file in which the translated sentence cache data is not stored is preliminarily registered into the translated sentence cache database 38 in step S9. In the preliminary registration, for the translated sentence cache file 42 having the contents of FIG. 5, the URL obtained from the original sentence file is stored into the URL 44 and "Last-Modified" of the original sentence file is stored into the file update data 46. "MODE" of the translating request information is stored into the translating direction 52 and, similarly, contents of "DIC1" to "DIC3" of the translating request information are stored into the use dictionary list 54. Naturally, since the translation of the original sentence file is not finished yet, contents of the translated sentence cache data 56 indicate an empty state. Further, "during translation" is stored as a cache state 50. As mentioned above, the translated sentence cache file in which the translated sentence cache data is empty is registered into the translated sentence cache database 38 by setting the cache state into "during translation" in step S9. After that, the translation executing unit 30 starts the machine translation with respect to the original sentence file in step S10. After completion of the machine translation, a translation result is stored into the translated sentence cache file in the translated sentence cache database 38 which has preliminarily been registered as translated sentence cache data and the cache state is changed from "during translation" to "available" in step S11. In step S15, the translated sentence data is transmitted to the client who made the translating request. If the foregoing cache parameters (1) to (4) coincide and the cache hit occurred in step S8, respectively, the processing routine advances from step S8 to step S12. Whether the cache state of the coincident translated sentence cache file is "during translation" or not is discriminated. If it is "during translation", since the machine translation of the original sentence file is being executed in response to the previous translating request, the translation server waits until the cache state is changed from "during translation" to "available" in step S12. If the cache state is "available" in step S12, step S13 follows. After the cache reference date 48 in the translated sentence cache file 42 in FIG. 5 is updated, the translated sentence cache data is transmitted to the client side in step S15. If the size of the obtained original sentence file is smaller than 5 kB corresponding to the cache target minimum original sentence size in step S6, step S14 follows. The machine translation of the original sentence file is executed in the translation executing unit 30 and a translation result is transmitted to the client side in step S15.

Figure 14B:
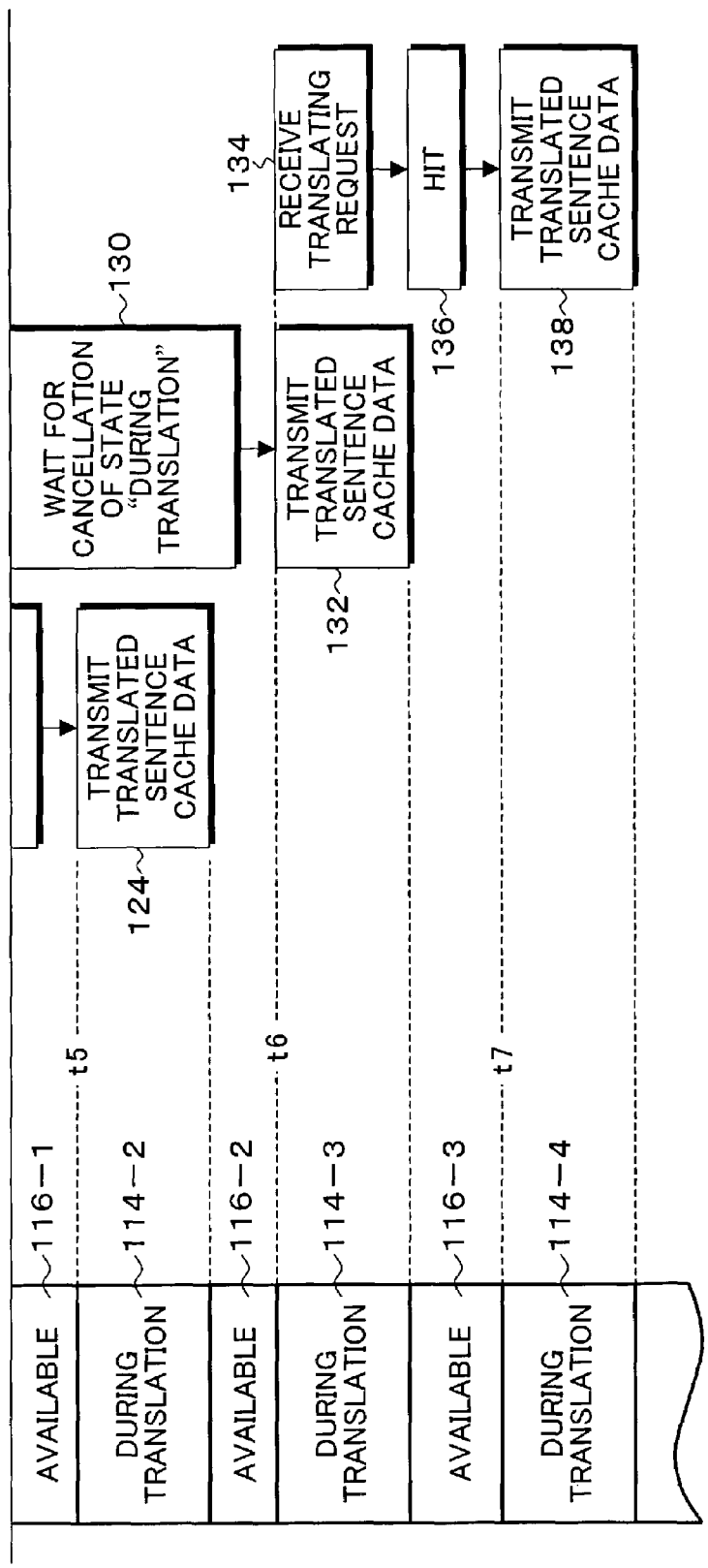

FIGS. 14A and 14B are time charts of the operation in the case where in the server translating process in FIGS. 13A and 13B, a plurality of translating requests are received to the same original sentence file during the machine translation of the original sentence file due to the translating request which has been received first. In a process 102 at time t1, the first translating request is received, the original sentence file is obtained in response to the translating request, and a search in the cache is performed. If the mishit occurred in a process 104 as a result of the cache search, cache preliminary registration is executed in a process 106. After that, a translating process by the machine translation is executed in a process 108. At this time, the cache state is "during translation" 114-1. After completion of the execution of the machine translation of the process 108, a translation result is registered into the cache in a process 110. The translation result is transmitted to the client side in a process 112. Thus, the cache state is set into "available" 116-1. On the other hand, assuming that a translating request of a process 118 is received at time t2 with respect to the same original sentence file during the execution of the machine translation of the process 108 based on the first translating request, since the original sentence file serving as a processing target has preliminarily been registered into the cache in the process 106 at this time, a cache hit occurs like a process 120. However, since the cache state at this time is "during translation" 114-1, the server enters a waiting state like a process 122. When the transmission of the translation result to the client side is finished in the process 112 and the cache state is set to "available" 116-1, the waiting state is cancelled. The translated sentence cache data can be obtained from the translated sentence cache database 38 and transmitted to the client side like a process 124. Also in the case where the translating request for the third same original sentence file is received by a process 126 as shown at time t3, the cache hit occurs like a process 128. However, since the cache state at this time is "during translation" 114-1, the server enters a waiting state like a process 130. After completion of the process by the process 124 from the translating request in the second process 118, the cache state is set to "available" 116-2, the waiting state in the process 130 is cancelled. The translated sentence cache data is obtained from the translated sentence cache database 38 and transmitted to the client side in a process 132. On the other hand, in the case where a translating request by a process 134 to the fourth same original sentence file is received at timing of time t6 when the transmission of the translated sentence cache data accompanied with the reception of the third translating request by the process 126 at time t3 is being executed, a cache hit occurs in a process 136. At this time, since the cache state is "available" 116-3, the translated sentence cache data can be immediately transmitted to the client side in a process 138. In this case, there is no cache waiting state. As shown in the operation of FIGS. 14A and 14B, when a plurality of translating requests are concentrated on the same original sentence file, if the machine translation is being executed due to the mishit by the first translating request, with respect to other translating requests received at this time, the cache data is transmitted to the client side after waiting for the change of the cache state to "available" due to the cache registration by the completion of the machine translation. Thus, the parallel execution of the machine translation in the case where the translating requests are concentrated on the same original sentence file can be avoided.

Figure 15A:
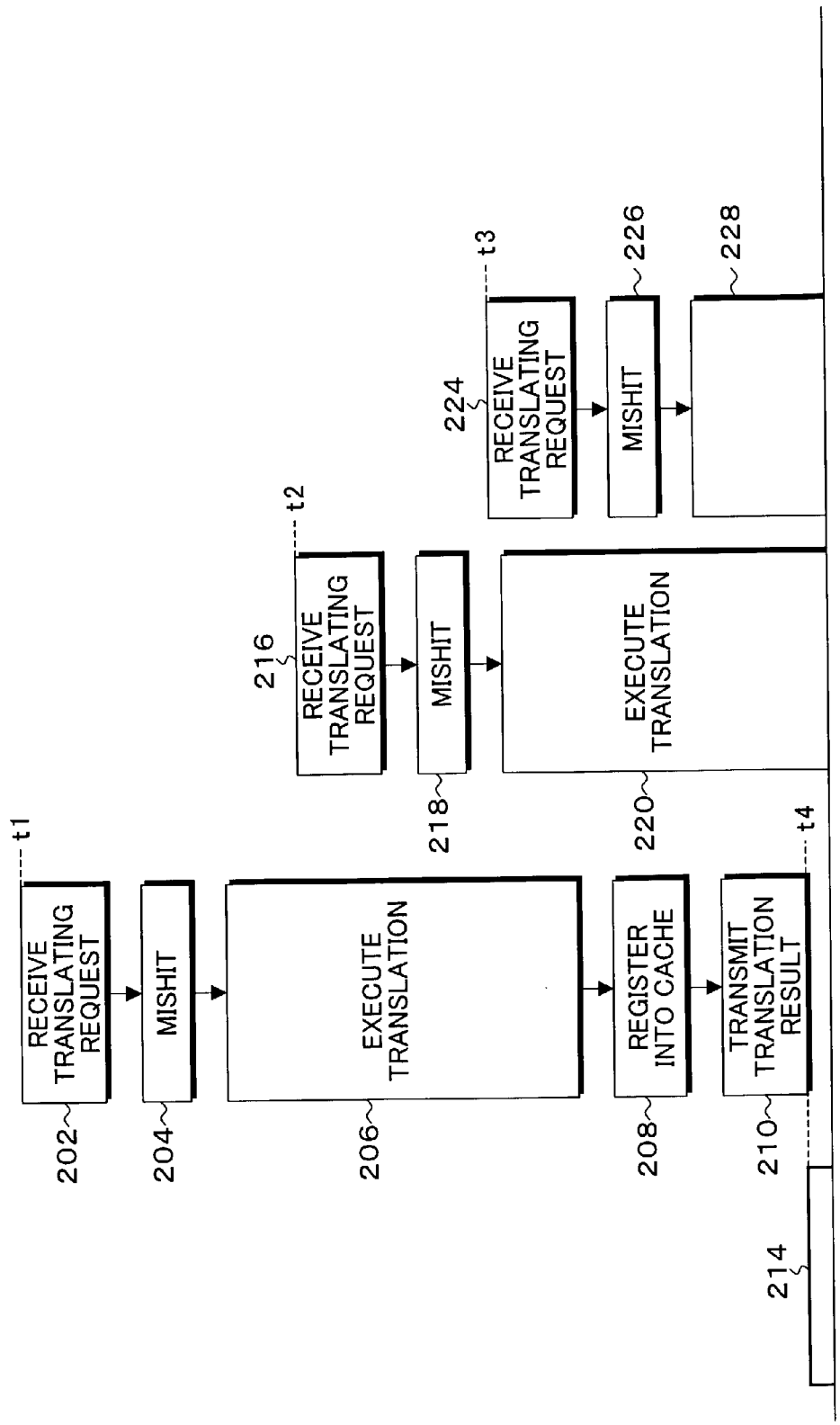
FIGS. 15A and 15B are time charts of the cache processing operation in the case of executing a cache registration after completion of the machine translation.
Figure 15B:
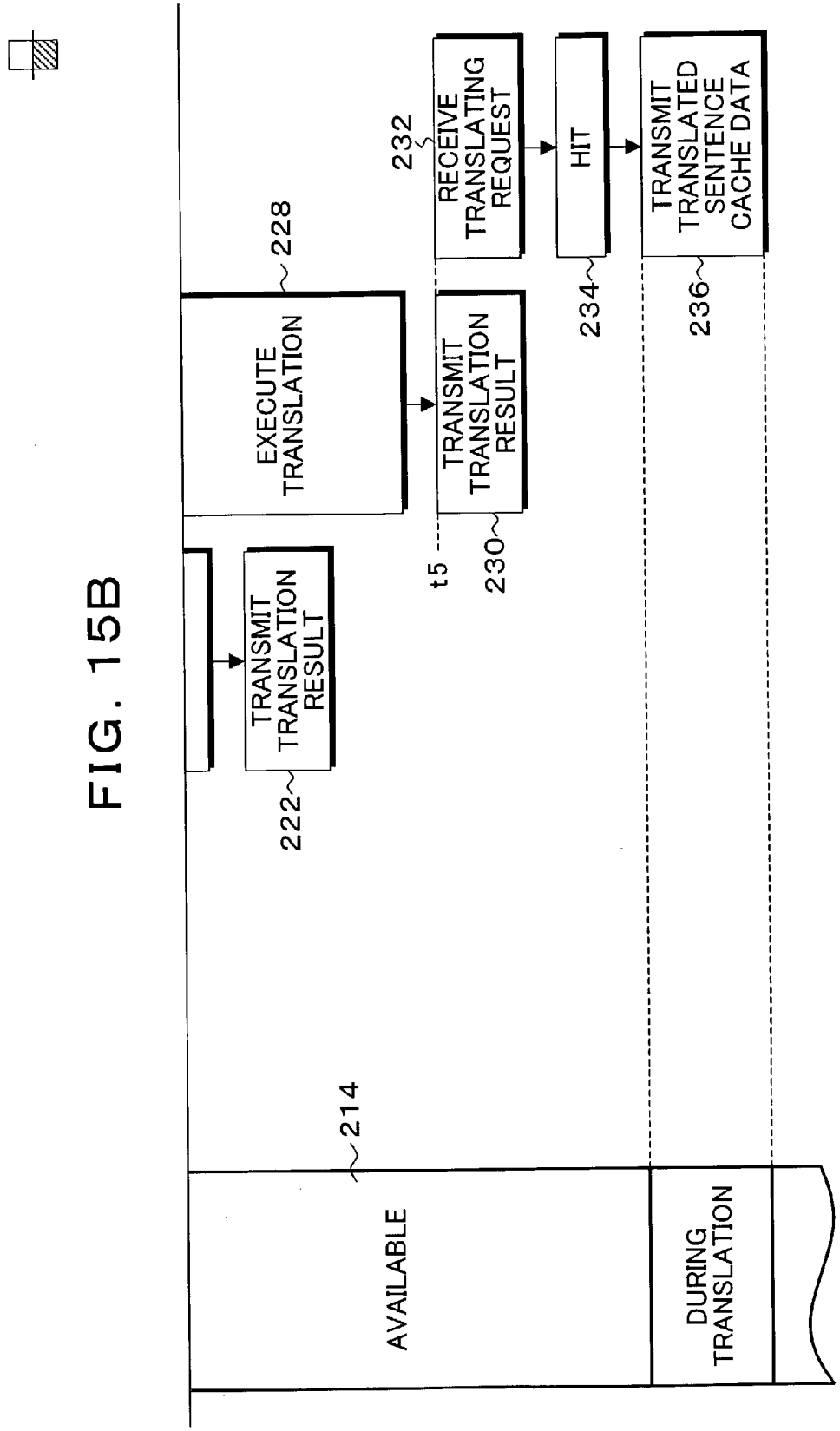

FIGS. 15A and 15B show the cache process in the case where a plurality of translating requests are concentrated on the same original sentence file in a manner similar to the case of FIGS. 14A and 14B. FIGS. 15A and 15B show the operation in the case where the preliminary registration of the translated sentence cache file is not performed prior to starting the machine translation like the invention but the translated sentence cache file is registered after completion of the machine translation. In this case, in response to the reception of the translating request at time t1 in a first process 202, a mishit occurs in a process 204, so that the execution of the translation is started in a process 206. When a translating request to the second same file is received like a process 216 at time t2 during the execution of the translation, since the file is not registered into the cache, a mishit occurs in a process 218. Therefore, the execution of the translation in a process 220 is started in parallel with the process 206 in the first translation execution. Further, assuming that the translating request is received with respect to the same file in a process 224 at time t3, a mishit occurs in a process 226. The translation regarding the same file is executed in a process 228. After completion of the translation execution of the process 206 responsive to the first translating request, the translated sentence cache file is first registered into the translated sentence cache database 38 in a process 208. A translation result is transmitted to the client on the first requesting source side in a process 210. At this time, although the cache state is set to "available" 214, with respect to the second translating request from time t2 and the third translating request from time t3, since the machine translation has already been executed in the processes 220 and 228, the cache is not used. Thus, until completion of the registration into the cache at time t4, with respect to all of the translating requests concentrated on the same original sentence file, the machine translation by the translation executing unit 30 is executed in parallel. Naturally, with respect to the translating request of a process 232 at time t5 received after time t4, a cache hit occurs like a process 234. The translated sentence cache data can be obtained from the translated sentence cache database 38 and transmitted to the client side in a process 236.

When the processes in FIGS. 15A and 15B as mentioned above are compared with those in FIGS. 14A and 14B in the translation server of the invention, the parallel processes of the machine translation by the translation executing unit 30 at the time when the translating requests are concentrated on the same original sentence file can be prevented according to the invention, and a burden on the processes of the machine translation by the translation executing unit 30 can be remarkably reduced. By executing the machine translation with respect to the first translating request and executing the cache process with respect to the subsequent translating requests, the whole translating time can be reduced.

FIG. 16 is a flowchart for an updating process of the translation dictionary 36 by the dictionary updating unit 34 in FIG. 2. In the translation dictionary updating process, the translation dictionary files uploaded in step S1 are reflected to the translation dictionary 36 which has already been stored on, for example, the HDD, thereby updating the dictionaries. Subsequently, in step S2, whether the operating mode is an all clear mode or not is discriminated. If YES, step S3 follows and all of the translated sentence cache files in the translated sentence cache database 38 are deleted. If the operating mode is not the all clear mode, step S4 follows and the translated sentence cache file using the translation dictionary as an updating target among the translated sentence cache file stored in the translated sentence cache database 38 is deleted.

In such a translation dictionary updating process, by deleting all of the translated sentence cache files or the translated sentence cache file using the dictionary as an updating target in association with the dictionary updating, only the translation results by the updated translation dictionaries are obtained after that. An updating result of the translation dictionaries can be properly reflected. The present invention incorporates many proper modifications without losing the objects and advantages of the invention and is not limited by the numerical values shown in the foregoing embodiment.

According to the invention as mentioned above, since the cache function is provided for the translation server itself, the original sentence file obtained from the Web page to which the translating request has been made once is machine-translated. However, since the translation result is held as a translated sentence cache file, the machine translation is not performed with respect to the subsequent translating request to the same Web page but the translated sentence cache file is read out and the server can respond. Even if the accesses are concentrated on the same Web page, by using the cache function, the translating time can be reduced.

Particularly, in the cache process of the invention, prior to machine-translating the original sentence file in response to the translating request, the translated sentence cache files are preliminarily registered into the translated sentence cache database, the cache state is set into "during translation", and the machine translation is executed. Therefore, if another translating request to the same original sentence file is received during the execution of the machine translation, the occurrence of the cache hit is determined. However, the server enters a waiting mode for the empty cache on the basis of the cache state. Thus, even if the translating request to the same original sentence file is received during the execution of the machine translation, the parallel execution of the machine translation of a plurality of original sentence files is prevented and the burden on the machine translation at the time of the cache mishit can be remarkably reduced. Further, when the translation dictionaries are updated, at least the translated sentence cache file using the translation dictionary serving as an updating target is cleared, so that the updating result of the translation dictionary can be certainly reflected to the translated sentence cache file and the updating result of the dictionary can be certainly reflected to the cache data.

The foregoing embodiment has been described with respect to the example of the case where the translation server is installed on the Intranet in a company, the translating requests are internally made from the clients, and the translation service is provided. However, it is also possible to connect the translation service 10 of the invention to the Internet 16, freely make the translating request from an arbitrary client via the Internet, and provide the translation service.

What is claimed is:

1. A translation server for providing a translating function to a client via a network, comprising:

a translation user interface control unit which receives a translating request from a user interface provided for said client and activates a translating process;

an original sentence obtaining unit which accesses an address designated in said translating request and obtains an original sentence file;

a translation executing unit which executes machine translation of said original sentence file by using a translation dictionary designated in said translating request; and a cache processing unit which searches a translated sentence cache file of a header matched with said translating request from a translated sentence cache database and transmits translated sentence cache data to said client, and if said translated sentence cache file cannot be searched, preliminarily registers the translated sentence cache file in which only the header matched with said translating request has been stored into said translated sentence cache database, thereafter, sets a cache state into "during translation", allows said translation executing unit to translate said original sentence file, transmits a translation result to said client, stores said translation result into said translated sentence cache file which has preliminarily been registered, and sets the cache state into "available".

2. A server according to claim 1, wherein said translation user interface control unit provides a homepage translation picture plane which can input and designate the translating request to a browser of said client on the basis of a homepage translation HTML.

3. A server according to claim 1, wherein when a size of said obtained original sentence file is smaller than a minimum size of a cache target, said cache processing unit does not execute the cache process but allows said translation executing unit to execute the machine translation.

4. A server according to claim 3, wherein said cache target minimum size is a file size in which a time that is necessary for the machine translation exceeds a predetermined time that is necessary for the cache process.

5. A server according to claim 1, wherein
said translation user interface control unit receives a translating request including a URL of the original sentence file, an update date of the original sentence file, a translating direction, and a use dictionary list as said translating request, and
said cache processing unit searches the translated sentence cache file of the header matched with the URL of the original sentence file, the update date of the original sentence file, the translating direction, and the use dictionary list obtained from said translating request from said translated sentence cache database.

6. A server according to claim 1, wherein when another translating request to the same translated sentence cache file is received in the cache state of "during translation" after said translated sentence cache files were preliminarily registered, said cache processing unit allows the cache process of said another translating request to be waited until said cache state enters "available".

7. A server according to claim 1, further comprising a dictionary updating unit which updates said translation dictionaries and, when the dictionaries are updated, clears the translated sentence cache files registered in said translated sentence cache database.

8. A translating method of a translation server which provides a translating function to a client via a network, comprising:
a translating request receiving step wherein a translating request from a user interface provided for said client is received and a translating process is activated;
an original sentence obtaining step wherein an address designated in said translating request is accessed and an original sentence file is obtained; and
a cache processing step wherein a translated sentence cache file of a header matched with said translating request is searched from a translated sentence cache database, translated sentence cache data is transmitted to said client, if said translated sentence cache file cannot be searched, the translated sentence cache file in which only the header matched with said translating request has been stored is preliminarily registered into said translated sentence cache database, thereafter, a cache state is set into "during translation", a translation executing unit is allowed to translate said original sentence file, a translation result is transmitted to said client, said translation result is stored into the translated sentence cache file which has preliminarily been registered, and the cache state is set into "available".

9. A method according to claim 8, wherein in said translating request receiving step, a homepage translation picture plane which can input and designate the translating request is provided to a browser of said client on the basis of a homepage translation HTML.

10. A method according to claim 8, wherein in said cache processing step, when a size of said obtained original sentence file is smaller than a minimum size of a cache target, the cache process is not executed but said translation executing unit is allowed to execute machine translation.

11. A method according to claim 10, wherein said cache target minimum size is a file size in which a time that is necessary for the machine translation exceeds a predetermined time that is necessary for the cache process.

12. A method according to claim 8, wherein
in said translating request receiving step, a translating request including a URL of the original sentence file, an update date of the original sentence file, a translating direction, and a use dictionary list is received as said translating request, and
in said cache processing step, the translated sentence cache file of the header matched with the URL of the original sentence file, the update date of the original sentence file, the translating direction, and the use dictionary list obtained from said translating request is searched from said translated sentence cache database.

13. A method according to claim 8, wherein in said cache processing step, when another translating request to the same translated sentence cache file is received in the cache state of "during translation" after said translated sentence cache files were preliminarily registered, the cache process of said another translating request is allowed to be waited until said cache state enters "available".

14. A method according to claim 8, further comprising a dictionary updating step wherein translation dictionaries are updated and, when the dictionaries are updated, the translated sentence cache files registered in said translated sentence cache database are cleared.

15. A computer program on a computer readable media which is executed by a translation server which provides a translating function to a client via a network, wherein said program allows a computer to execute:
a translating request receiving step wherein a translating request from a user interface provided for the client is received and a translating process is activated;
an original sentence obtaining step wherein an address designated in said translating request is accessed and an original sentence file is obtained; and
a cache processing step wherein a translated sentence cache file of a header matched with said translating request is searched from a translated sentence cache database, translated sentence cache data is transmitted to said client, if said translated sentence cache file cannot be searched, the translated sentence cache file in which only the header matched with said translating request has been stored is preliminarily registered into said translated sentence cache database, thereafter, a cache state is set into "during translation", a translation executing unit is allowed to translate the original sentence file, a translation result is transmitted to said client, said translation result is stored into said translated sentence cache file which has preliminarily been registered, and the cache state is set into "available".

16. A program according to claim 15, wherein in said translating request receiving step, a homepage translation picture plane which can input and designate the translating request is provided to a browser of said client on the basis of a homepage translation HTML.

17. A program according to claim 15, wherein in said cache processing step, when a size of said obtained original sentence file is smaller than a minimum size of a cache target, the cache process is not executed but said translation executing unit is allowed to execute machine translation.

18. A program according to claim 17, wherein said cache target minimum size is a file size in which a time that is necessary for the machine translation exceeds a predetermined time that is necessary for the cache process.

19. A program according to claim 15, wherein
in said translating request receiving step, a translating request including a URL of the original sentence file, an update date of the original sentence file, a translating direction, and a use dictionary list is received as said translating request, and
in said cache processing step, the translated sentence cache file of the header matched with the URL of the original sentence file, the update date of the original sentence file, the translating direction, and the use dictionary list obtained from said translating request is searched from said translated sentence cache database.

20. A program according to claim 15, wherein in said cache processing step, when another translating request to the same translated sentence cache file is received in the cache state of "during translation" after said translated sentence cache files were preliminarily registered, the cache process of said another translating request is allowed to be waited until said cache state enters "available".

21. A program according to claim 15, further comprising a dictionary updating step wherein translation dictionaries are updated and, when the dictionaries are updated, the translated sentence cache files registered in said translated sentence cache database are cleared.

* * * * *